United States Patent Office 3,469,614
Patented Sept. 30, 1969

3,469,614
SEMIRADIAL PNEUMATIC TIRES
Takashi Kobayashi, Hiratsuka-shi, Japan, assignor to The Yokohama Rubber Company, Limited, Tokyo, Japan, a corporation of Japan
Filed Oct. 4, 1966, Ser. No. 584,155
Claims priority, application Japan, Oct. 29, 1965, 40/66,098
Int. Cl. B60c 9/10
U.S. Cl. 152—355    2 Claims

ABSTRACT OF THE DISCLOSURE

A pneumatic tire in which a breaker layer including cords which extend at an angle in the range from 22–29° to the circumferential line around the tire is placed on a carcass layer including cords which extend in the crown portion at an angle in the range of from 50–65° with respect to the circumferential line around the tire, with an intermediate layer of a rubber material having relatively high fluidity, when unvulcanized, interposed between the carcass and breaker layers, the layers being shaped and vulcanized on the drum in a single operation to form the tire.

---

Figure 1:
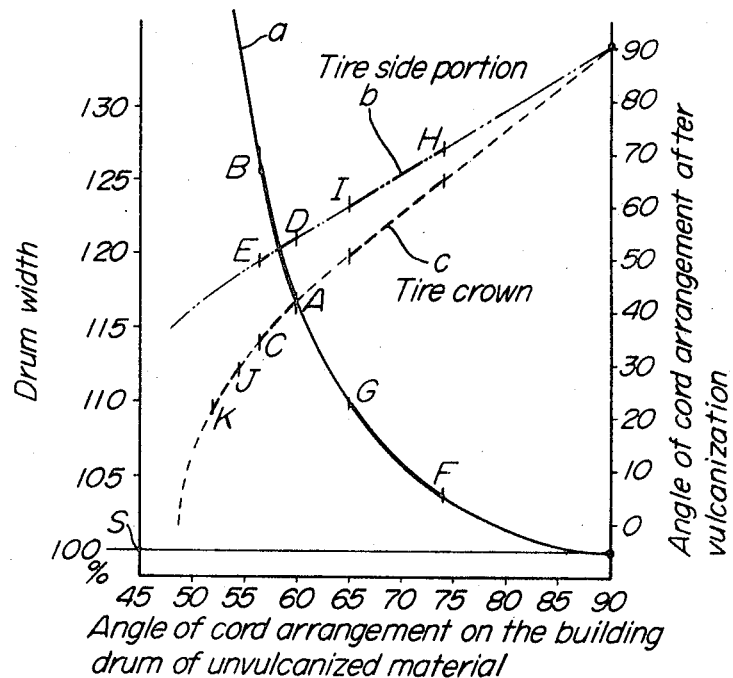

This invention relates to pneumatic tires and particularly to those of the so-called "radial" type as distinct from the more conventional "bias" type.

As commonly used by the trade, the term "radial" means a pneumatic tire structure which includes a carcass layer comprised of radial cords, which extend in radial planes including the tire axis, and a breaker layer comprised of circumferential cords extending along the outer periphery of the carcass, as it were, to hoop the latter.

While having a number of advantages over conventional bias tires, the radial tires have involved various deficiencies and this accounts for the delay in popular use of the tire type.

Major advantages of the radial type of tires over bias type tires are as follows: (1) First, since the tread portion of the radial tire is reinforced by the layer of cords extending substantially circumferentially of the tire and functions, as it were, like a caterpillar for the tire during its travel, the slippage of different parts of the tire tread with respect to the road surface is minimized, giving an overwhelming wear resistance to the tire. (2) Secondly, for the same outer peripheral size, the radial tire gives a larger actual travel per one complete revolution owing to the caterpillar effect referred to above, a smaller rolling resistance and hence a reduced engine fuel consumption. (3) Thirdly, during the cornering of the vehicle the radial tires give substantially no squeal owing to the caterpillar effect of their cord arrangement. (4) Fourthly, during the travel of radial tire, movement of the rubber material under the tread surface is limited, giving rise to no substantial change in groove width of the tire tread. Thus, substantially no pattern noise takes place which is based upon the otherwise occurring compression and suction of air in the passages defined by the tire grooves and the road surface. (5) Fifthly, radial tires having a proper tire profile, give a large cornering force, a low longitudinal spring constant and a good cushioning effect, as compared with bias type tires. (6) Sixthly, owing to the caterpillar effect of the radial cord arrangement, radial tires undergo only limited slippage even on ice or snow and are thus applicable as snow tires. (7) Radial tires withstand heavy loads and are usable even on trucks and buses since even when subjected to substantial deformation they are not subjected to any high local stress owing to their cord arrangement. (8) Finally, because of the hoop-like structure on the outer periphery of the tire, the occurrence of standing waves in the tire during its highspeed travel is effectively prevented. The radial type cord arrangement is also theoretically most desirable for high speed services.

On the other hands, radial tires offer various important problems as follows: (1) Firstly, unlike bias tires, a radial tire being built on the drum cannot be expanded once the breaker portion has been laid around the drum as a sturdy hoop. Accordingly, the breaker layer must be laid around the drum after only the radial cord portion of the tire has been formed on the drum and subsequently expanded. The tire building process is thus inevitably divided into two steps. In addition, the tire tread can only be formed by laying its crown and side portions separately. Under this situation, the building efficiency is naturally reduced to one-half or one-third of that for tires of the conventional bias structure. For convenience' sake, this tire building process will be referred to hereinafter as a two-step building process. As is readily understood, any equipment for building tires of the conventional bias structure can hardly be employed with success for the building of radial tires and thus investment for special equipment is required for successful production of the latter.

(2) Secondly, such complicacy in process and reduction in production capacity also take place in the vulcanizing process. Under these circumstances, the manufacturing cost of radial tires is ordinarily 30 to 80% or more higher than that of bias ones, offsetting the advantage of the radial type of tires having an improved wear resistance.

(3) Thirdly, under the present road conditions in Japan and some other countries where bad and well-paved roads coexist, pneumatic tires must be usable even on bad roads. Radial tires, however, can hardly conform to gravels and other irregularities on the road surface for their accommodation due to the arrangement of the breaker cords, which extend circumferentially of the tire in the direction of tire travel. Therefore when the tire rides over such road irregularities, the load on the tire must be supported solely by its local portion lying on the road irregularities. This may result in a "cut-through" damage to the tire to allow rainwater and other fluid to reach the breaker cord layer of the tire and cause its corrosion to such an extent as to make the tire unusable.

(4) Fourthly, since the side portions of the radial tire only have cords extending radially of the tire, so-called "radial" or "traction" cracks are liable to occur in the side rubber portions as the tire is used for traction. To overcome this situation, it is necessary to use cords of limited elongation for the tire carcass and to use rubber material of substantial elongation for the side tread.

(5) For the same reason as in (4), the stress in the tire material due to the internal pressure or the traction is all concentrated in the bead portions by way of the side portions without being attenuated therein. Under this condition, the tire bead portions must be specially constructed to exhibit a strength enough to prevent any torsional or other damage to the beads. Fabrication of such special beads apparently necessitates special equipment and process.

(6) As pointed out above, radial tires can hardly yield to accommodate any substantial irregularities on the road surface due to the use of breaker cords extending circumferentially of the tire. Because of this, with radial tires, any irregularities on the road surface including those at its junctions or variations in rigidity of the tire structure due to some eccentric arrangement of the tread or breaker splices are liable to give rise to vibration and noise. Accordingly, use of radial tires makes it necessary to employ an unsprung structure essentially adapted for use with the radial tires.

(7) During the drive, radial tires are liable to stagger or wobble because of its limited lateral rigidity principally based upon the pneumatic pressure, no internal stress being produced in the carcass to resist deformation owing to the radial type carcass structure.

(8) With radial tires, cord material of limited elongation is recommendable for their radial cord layer but nylon cords are hardly usable notwithstanding their excellent adhesion characteristic, high flexibility and economic advantage.

(9) Since the carcass cord layer only includes cords extending in radial planes, as pointed out, radial tires are liable to rip or burst if a cut is formed in their side portion.

It will be apparent that the advantageous features of radial tires including their high-speed and wear-resistance characteristics cannot be fully utilized unless the above-mentioned deficiencies of radial tires be made up for.

The inventor made close analyses and experiments on radial tires with respect to their advantages and disadvantages and reached the following conclusions.

(1) To enable mass production of radial tires, it is essential to provide therefor a one-step building process which corresponds to the conventional process for manufacturing tires of bias structure.

(2) In addition to the mass production feature, it is necessary for cost reduction to arrange the carcass cords at high angles or angles close to the radial direction. The effect of the high-angle cord arrangement can be shown by a quadric curve varying with the cord angle.

(3) To maintain the high-speed and wear-resistance characteristics, the breaker cord layer should include cords arranged at low angles or angles close to the circumferential direction. The effect of such arrangement can be shown by a quadric curve varying with the cord angle and increases as the direction in which the breaker cords extend comes close to the circumferential direction of the tire.

(4) The tire durability relative to the radial and traction cracks can also be shown by a quadric curve drawn with respect to the angle of cord arrangement.

(5) With radial tires, the breaker rigidity or the relationship between the angle of breaker cord arrangement and the cut-proofness or the accommodation ability for road irregularities can also be illustrated as a quadric curve though it has some relation with the carcass angle.

(6) Also quadric is the relationship between the cornering force or lateral rigidity and the angle of carcass or breaker cord arrangement.

As for other characteristic features of radial tires, experimental results show that they also have a quadric relation with the angle of cord arrangement. Their characteristic curves will be described in detail hereinafter.

To conclude, it has been found that the angle of cord arrangement for radial tires or the one appropriate to make up for most of their defects while practically maintaining their characteristics lies between 50° and 65° as measured at the tire crown for the carcass and between 22° and 29° for the breaker. Also, it has been found that tires with such cord arrangement can be manufactured in practically the same manner as conventional tires by following the procedure described below.

At first, the carcass portion of the tire is formed on an ordinary building drum or a drum having an outer diameter more or less larger than that of the ordinary one. Before laying the breaker portion on the carcass thus formed, an intermediate rubber layer of unvulcanized highly fluid rubber and having a thickness of the order of 1 to 3 mm. is applied. The breaker is then formed on the rubber layer and the treated is applied onto the breaker to obtain a green tire, which is subsequently subjected to conventional forming and vulcanizing processes. The results of experiments conducted by varying the breaker cord angle from 20° to 30° for different carcass cord angles ranging from 90° for the radial arrangement to 35–40° for the regular arrangement showed that the range of angle of breaker cord arrangement should be limited between 22° and 29° for satisfactory mass productivity of the tire particularly in connection with the forming technique.

In fact, it has been confirmed by conducting tests with the lifting ratio (i.e., ratio of the outside diameter of the building drum to that of the tire vulcanized) ranging between 1.21 and 1.55 that, from the practical viewpoint, it is almost impossible to manufacture tires having an angle of breaker cord arrangement of less than 22° because of the inefficiency involved in the process of building and forming such tire. This fact indicates that, in the building process employing a lifting ratio to allow mass production, the range in which the cord layers embedded in the rubber and extending bias to each other are movable against the viscosity resistance of the rubber is limited.

In order to minimize the angle of arrangement for such limitation, it is necessary to reduce the viscosity of the tire rubber by preheating the tire while selecting a rubber material having a low viscosity in its unvulcanized state. Also, in order that the breaker cord layer, widely differing from the carcass layer in angle of arrangement, may be relatively freely deformed in the forming stage, it is necessary to interpose between the carcass and breaker layers a rubber layer of 1 to 3 mm. thickness which is in its unvulcanized state highly deformable relative to the carcass and breaker layers. It is desirable also to insert an unvulcanized rubber sheet between the breaker layers, in which the angle of cord arrangement varies widely from the value when built up on the drum to the value after vulcanization. The rubber sheet should be deformable as highly as possible and have a thickness at most of 0.3 to 1.0 mm.

Obviously, the angle of breaker cord arrangement can be reduced with the lifting ratio. Reduction of the latter, however, is limited by the procedure of turning up and down the carcass layer in the beads being formed.

Figure 5:
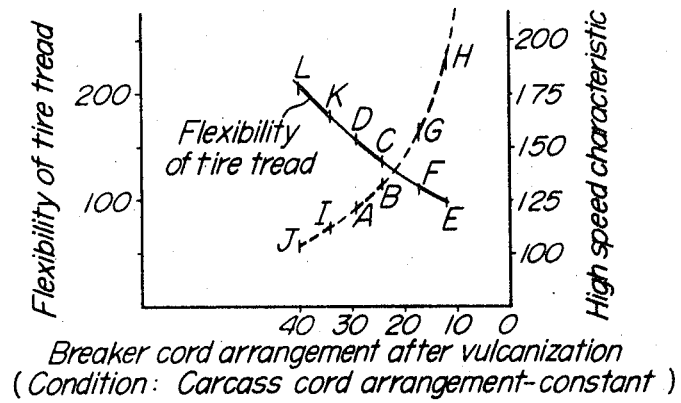
Figure 6:
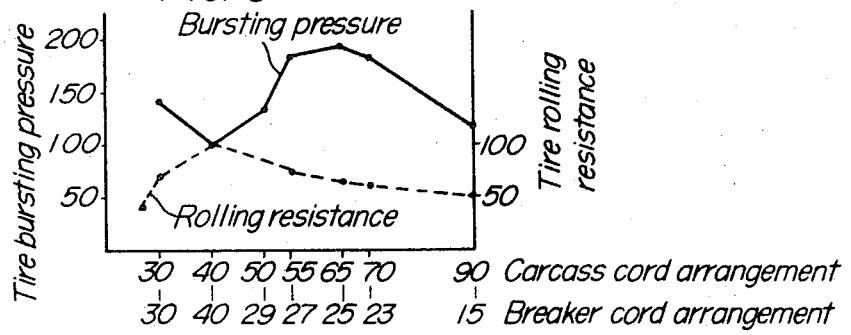
Figure 7:
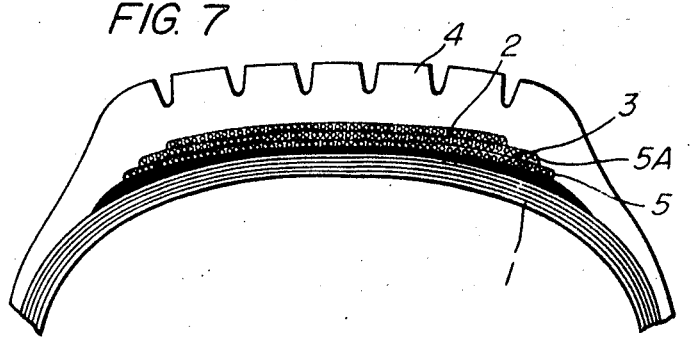

For a better understanding of the present invention, description will next be made with reference to the accompanying drawings, in which:

FIGS. 1 to 6 represent characteristic curves illustrating different capabilities of the semiradial tire of the present invention; and FIG. 7 is a fragmentary cross section of the crown portion of a tire embodying the present invention.

The results of experiments described hereinbefore can be summarized as follows:

To reduce the manufacturing cost and particularly the material cost of tires, it is principally important to minimize the cloth width of the building material and to this end to reduce the width of the building drum. There is a close relation between the drum width and the angle of cord arrangement after vulcanization or that of the cloth on the building drum as follows though the relation more or less depends on the tire size as well as on the lift ratio.

In FIG. 1, curve $a$ represents the relationship between the angle of cord arrangement on the building drum and the drum width, and curve $b$ represents the relation between the angle of arrangement on the building drum of the unvulcanized material in the tire side portion susceptible to radial cracks and the angle of arrangement of the same material after vulcanization. Curve $c$ illustrates the relationship between the arrangement angle in the tire crown on the building drum and that after vulcanization. On the abscissa, the cut angle 90° corresponds to the cord arrangement in the carcass of radial tires, showing that the cords in radial tires have a minimum length, which corresponds to the least drum width S. As seen from curve $a$, the relation between the drum width and the cut angle is quadric gradually approaching the minimum value S. The thick-line portion A–B of the curve $a$ represents the range for use of the conventional bias arrangement. On the other hand, the angular range of the carcass layer to be employed in the present invention is represented by the curve segment F–G. It is to be noted that, while the conventional carcass structure has a width approximately 20% larger than the minimum drum width, the carcass structure of the invention is required only to have a width 5% larger than the minimum drum width and thus enables a substantial reduction in cost while facilitating fabrication of the tire.

The side portions of radial tires are susceptible to radial or traction cracks as their carcass layer also extends at 90° to the circumferential line and the traction cracks normally run at approximately 60°. As observed from curve b, however, the range H–I of the angle of cord arrangement after vulcanization, which corresponds to the inventive range of drum width F–G, is close to 60° where traction cracks most hardly occur and lies between 60° and 70° where the material cost is minimized due to the reduced drum width.

The drum width, cut angle and cut, vulcanized angle which allow forming and vulcanization can be determined by calculation as follows: First, the drum width is found to be infinitely large for the lift ratio of 1.557 and the cut angle of not more than 48° 25'. In this case, the crown angle after vulcanization is approximately 0° and cannot be reduced any further. In this calculation, however, such factors as mutual interference between the cord layers, resistance of the tread rubber to deformation and that of the unvulcanized rubber to deformation are not taken into account and, in practice, the arrangement angle as measured after vulcanization cannot be reduced to less than about 22° as long as it allows building and forming processes for the above value of lift ratio, and suitably ranges from 22° to 29°. This range can be applied with a lowest lift ratio allowable from the standpoint of the building efficiency.

As for breaker layers according to the present invention, it is indicated by the segment K–J of curve c that the angle of cord arrangement after vulcanization also lies substantially in the range of 22° to 29°. The width of such breaker as laid on the drum is much larger than that of the breaker of conventional bias type tires, indicating that the arrangement angle can hardly be decreased beyond the range.

Figure 2:
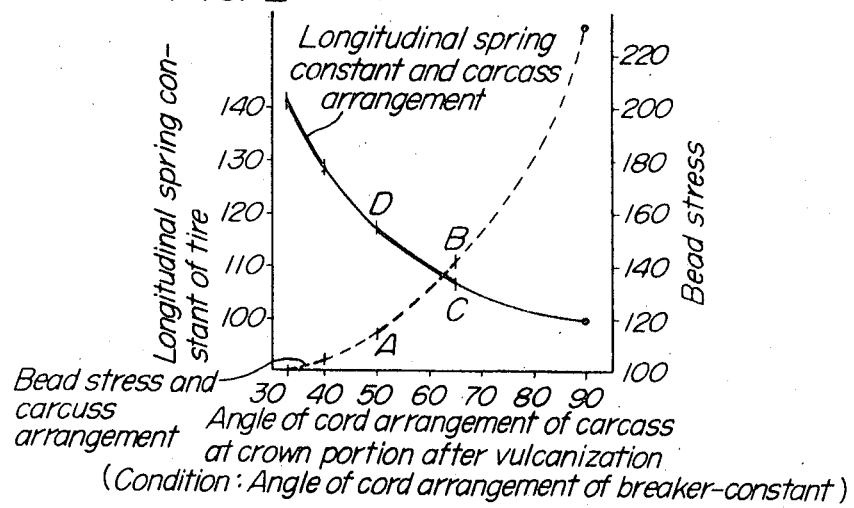

FIG. 2 illustrates the relation of the longitudinal spring constant of the tire or the bead stress to the angle of cord arrangement of the carcass at its crown portion. It is suggested from this illustration that bias type tires cannot give any satisfactory riding comfort when used on passenger cars because of their excessively high longitudinal spring constant and that radial tires should have a particularly high strength in their bead portions because of their high bead stress. According to the present invention, it has been found that pneumatic tires can give a riding comfort comparable to that given by radial tires while precluding occurrence of trouble in the bead portions as long as they are designed in the range of the curve segments A–B and C–D in FIG. 2.

Figure 3:
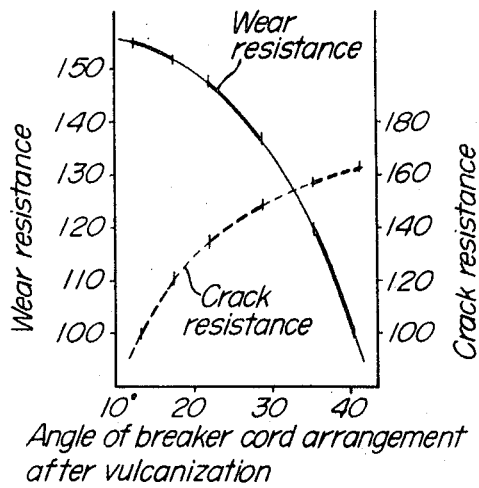

FIG. 3 illustrates the relationships between the wear resistance and the angle of breaker cord arrangement and between the crack resistance and the breaker cord angle. As observed, in the case of radial tires where the breaker cords are inserted in two steps, the range of breaker cord angle of 12° to 18° is desirable from the standpoint of wear resistance. From the standpoint of crack resistance, it is observed that the angular range of 35° to 40° is recommendable for breaker cords which is usual with bias type tires. The inventive angular range of 22° to 29° lies intermediate the above two ranges and is thought appropriate to realize the advantageous characteristics of both the tire types at the same time.

Figure 4:
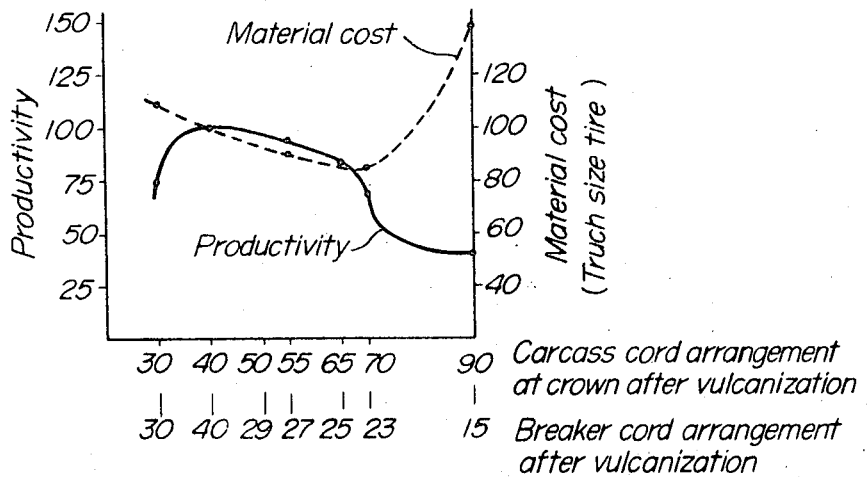

FIG. 4 shows the relationship between the productivity of truck size tires and the angle of cord arrangement after vulcanization thereof and also the relationship between the material cost and angle of cord arrangement of such tires. As observed the productivity of the tires is only 40% of the productivity of regular tires having an angle of carcass cord arrangement of approximately 40° and that of breaker or insert cord arrangement of 40° and even the combination of carcass angle 70° and breaker angle 23° gives a reduced production efficiency. Such reduction in productivity can be accounted for by the forming difficulties, which depend upon the angle of breaker cord arrangement and the productivity is reduced to an extreme extent as the angle of cord arrangement is reduced below a predetermined value. The angle of cord arrangement of less than 22° makes it practically infeasible to follow the conventional forming technique. In fact, radial tires having an angle of cord arrangement in the range of 12° to 17° are usually produced in two steps; that is, the breaker and tread are laid on the formed carcass only after it has been suitably expanded. This two-step process has obviously restricted any substantial improvement of the productivity of radial tires.

As for material cost, that for the carcass is reduced as the cord angle approaches 90°, as observed from FIG. 1. However, if the cord angle comes excessively close to 90°, the breaker cost must rise for better reinforcement of the tire in the direction circumferential thereof and the bead structure must be modified requiring use of high-quality rubber material. Further, as radial tires inherently must include a carcass cord layer of limited elongation, and particularly in the case of truck tires, necessarily employing a high internal pressure, they include carcass cords of wire. Under these situations, the whole cost of material is rather increased, as the angle of carcass cord arrangement comes close to 90°, as shown, and, taking into account both productivity and material cost, an angular range of 50° to 65° is most recommendable for carcass cords and that of 22° to 29° for breaker cords.

In FIG. 5, the solid-line curve illustrates the relation between the high-speed characteristic and the angle of breaker cord arrangement and that between the flexibility of the tire tread or its yieldability to the irregularities of the road surface and the angle of breaker cord arrangement, both obtained by experimenting with a fixed carcass structure. In case the tire lacks an appropriate yieldability to the road irregularities, it transmits to the car body vibrations corresponding to the road irregularities. Therefore, radial tires cannot be suitably employed on vehicles other than those having a special suspension mechanism but they exhibit overwhelmingly excellent high-speed characteristics due to the arrangement of breaker cords, which extend substantially circumferentially of the tire.

The high-speed characteristics of pneumatic tires of both radial and bias type vary not only with the angle of cord arrangement in the crown portion of the carcass layer but also with that in the breaker layer and thus with the rigidity distribution in their carcass crown and breaker portions. In the experiments conducted by the inventors, a high-speed characteristic of 140% was obtained with the carcass angle of 65° and breaker angle of 25° in contrast to the 100% high-speed characteristic of the tire having the angle of cord arrangement of 40° for both carcass and breaker. Taking into account variations in structure as well as in material, the high-speed characteristic of tires having the cord angles 65° and 25° can be safely estimated to lie in the range of from 130% to 160%. Also, radial tires having a carcass angle of 90° and a breaker angle 15° exhibit a high-speed characteristic of the order of 160%.

FIG. 6 illustrates the variation of bursting pressure with the tire structure as obtained in water-pressure tests and shows the fact that the cord arrangement according to the present invention gives an unexpectedly high pressure resistance, causing a rupture in such different tire parts as the sides, beads and breaker. This indicates that the tire strength is distributed rather uniformly over the different parts of the tire. On the other hand, radial tires a rupture mostly in the bead portions, exhibiting their high uniformity in strength compared with regular tires, which tend to rupture in their breaker or bead portion. This also indicates that with the inventive cord arrangement the individual reinforcing cords are efficiently made use of to impart a high burst strength to the tire irrespective of their rather limited volume.

FIG. 6 also illustrates the rolling resistance for different cord ararngements. As shown, tires of the conventional structure give a maximum rolling resistance, whereas radial tires and racing tires of 28° carcass angle give a limited rolling resistance. Tires of the inventive cord arrangement are rather comparable to radial tires exhibt a rolling resistance about equal to or rather lower than that of high-speed tires of 30° to 33° arrangement.

As for the cornering characteristic, it has been found that the inventive tire structure gives a cornering force much larger than that obtained with tires of the conventional bias cord arrangement, even exceeding radial tires. Compared with the maximum cornering force of high-speed tires of 125 and that of radial tires of 130, both in percent ratio to the maximum cornering force of regular tires, the inventive tire structure has been found exhibit an excellent cornering characteristic giving a value in the range of from 125 to 140.

In order to enable mass production of such tires having excellent characteristics, it is desirable to minimize the restraint acting upon the carcass and breaker cord layers in the unvulcanized tire so that they may readily settle in their appropriate position properly modifying the angle of cord arrangement during the forming process.

In this connection, it has been found that such forming process can be made readily performable in subsequence to the conventional building process, which employs a building drum as in the building of regular tires, by arranging between the breaker and carcass cord layers an intermediate layer of rubber material 1 to 3 mm. thick according to the tire dimensions and the lift ratio and which exhibits a high fluidity before vulcanization as contrasted with the breaker and carcass cord layers. Thus, the use of the intermediate rubber layer enables mass production of the tires and substantial reduction in their manufacturing cost. It has also been found that the forming process can further be facilitated by employing a rubber layer also between the layers of the breaker.

During the tire forming process, through the breaker cords are subjected to change in angle of arrangement, the carcass cords are restrained contrariwise and thus are liable to form waves or curls. This tendency grows conspicuous as the angle of carcass cord arrangement approaches 90°. It has been found, however, that this tendency can be practically eliminated by reducing the angle of carcass cord arrangement from "radial" to 70° or less and that the tendency can be completely eliminated by use of carcass cords of nylon owing to the heat shrinkage of the cord during vulcanization. Thus, though with radial tires use of nylon cords has previously been avoided because of their inherently high elongation, it is rather desirable at times in the practicing of the present invention and this forms one of the important advantages of the invention.

FIG. 7 illustrates the cross section of a truck tire vulcanized after the forming operation. As shown, the tire structure includes a carcass 1, a breaker 2 and a layer 3 of 1 to 3 mm. thickness interposed therebetween and formed of rubber material highly deformable in its unvulcanized state. As seen in this figure, the rubber intermediate layer is relatively large in thickness in the shoulder portions but of reduced thickness in its central crown portion under the rigidity of the carcass and breaker portions together embracing the rubber layer.

The tire shown differs from radial tires not only in angle of cord arrangement of the carcass and breaker layers but also in the following points. Unlike radial tires including a breaker laid only after the expansion of the tire carcass, the inventive tire is fabricated by substantially the same building process as that employed for common tires including a high lift ratio. Accordingly, in the inventive tire, the breaker layer is laid to extend along the carcass with a curvature approximating that of the crown portion of the carcass cord layer irrespective of the material of the breaker cords such as nylon, rayon, steel wire or glass. In contrast to this, the breaker portion of radial tires, with which only a limited lift ratio is employed, is fitted in the form of an annular band over the carcass portion after the latter is formed and inflated directly or indirectly through the medium of a bladder or rubber lag and is thus positioned practically parallel to the road surface. This makes it necessary to previously apply onto the carcass a rubber material of triangular cross section to fill up the space between the carcass and breaker shoulder portions thereby to facilitate application of the breaker to the curved carcass despite the band form of the breaker. The triangular section of the rubber strip must be determined with utmost care and such strip be laid with skill in order to avoid inclusion of air between the breaker and the carcass and further between the breaker and the tread subsequently laid thereon. Otherwise, radial tires will inevitably suffer from separation and other troubles due to the air inclusion.

In contrast to the above, the inventive tire can all be built on a solid building drum, advantageously enabling application of a satisfactory rolling pressure to minimize air inclusion. Also, for the shoulder portions of radial tires are susceptible to some strain as the breaker is commonly fitted over the carcass in a position substantially parallel to the road surface independently of the curvature of the carcass.

Further, according to the present invention, the lift ratio used in the forming operation after the insertion of the breaker portion is much higher than that used with radial tires. Accordingly, the end portions of the breaker during the forming operation is drawn up under the restraint of the carcass and tread rubber with the result that

| Item | Radial | Inventive | Regular |
|---|---|---|---|
| Carcass lift | 1.4–1.7 (1.2–1.7) | 1.4–1.7 (1.2–1.7) | 1.4–1.7. |
| Breaker lift | 1.06–1.10 | 1.4–1.7 (1.2–1.7) | 1.4–1.7. |
| Angle of carcass arrangement, $\theta$, after vulcanization (crown). | 90° | 50–65° | 35–41°. |
| Angle of breaker arrangement, $\alpha$, after vulcanization. | 12–18° | 22–29° | 35–41°. |
| Angle of tire side carcass arrangement | 90° | 60–70° | 50–55°. |
| Carcass cut angle for building | 90° | 65–73° | 57°–61°. |
| Breaker cut angle for building | 12–19° | 52–55° | 57–61°. |
| Rubber layer between carcass and breaker. | Triangular cross section, in two. | Rubber sheet, 1–3 mm. | Rubber sheets, 0.25–1 mm. |
| Bead structure | Special | Regular | Regular. |
| Cord angle at breaker ends | 12–22° | 35–50° | 35–45°. |
| Cross-sectional curvature of breaker vulcanized. | Almost rectilinear | Substantially along the carcass. | Along the carcass. |
| Carcass building drum [1] | Regular (or special) | Regular (or special) | Regular. |
| Breaker building drum | Special | Not needed | Not needed. |
| Bladder drum for breaker and tread insertion after expansion of carcass. | Needed | Not needed (same as carcass drum). | Not needed (same as carcass drum). |
| Material for carcass cords | Wire, rayon, etc | Nylon, rayon | Nylon, rayon. |
| Material for breaker cords | Wire, rayon, glass, etc | Nylon, wire, rayon, glass | Nylon, rayon. |

[1] The carcass building drum may be of the ordinary type using an ordinary lift ratio but sometimes may have its lift ratio slightly reduced to produce tires including breaker cords arranged at smaller angles.

the breaker end portions 5 and 5A of limited rigidity are moved to flow at an angle approaching the cord angle, which is slightly larger than their inherent angle. While with radial tires the rigidity change of the tire itself occurring at such end portions is substantial and stepwise discontinuous, the degree of discontinuity is reduced according to the present invention as the end portions approach the carcass angle. This means that the stresses possibly occurring in the breaker end portions can be reduced with ease according to the present invention.

Obviously, the restraint from the tread can be further reduced by interlaying between the breaker cord layer 2 and tread 4 a rubber layer just like the one indicated at 3 having a thickness of the order of 0.5 to 1.0 mm.

It has also been found that preheating the tire to a temperature of from 50° to 70° C. prior to the forming operation is effective to reduce the viscosity resistance of rubber and hence increases its fluidity to facilitate the forming operation and that tires having a radial carcass arrangement and a breaker arrangement at an angle of not more than 22° can be fabricated by employing an ordinary building drum and a reduced lift ratio.

The above table illustrates the structural differences between the radial, regular and inventive tires for passenger use.

Having described the advantageous features of the present invention, it may be appropriate to explain at this point why the cord arrangement in pneumatic tires has previously been restricted to the two types described hereinbefore, bias and radial.

In the conventional bias type tire, which includes a major cord arrangement in the form of a carcass layer, the breaker is only required to serve the function of attenuating the stress occurring between the carcass and tread layers and of keeping any cut possibly occurring in the tire tread during travel on a bad road from extending into the carcass layer. Under such conditions, there has been no substantial reason for employing an angle of breaker cord arrangement different from the carcass cord angle. In fact, the angle of breaker cord arrangement in conventional bias tires has been determined in the range of the order of ±2° relative to the carcass angle.

The angle of breaker cord arrangement, however, has been varied to the order of 28° to 34° with racing and high-speed tires in order to cope with the centrifugal effect of the tire and to increase its cornering force and maneuvering stability any excessive lowering of the angle of cord arrangement may cause the tire sides to crack in a circumferential direction due to fatigue of the rubber and in addition tends to increase the material cost of the tire as shown in FIG. 1.

In contrast, radial tires rely for reinforcement against the inflational pressure principally upon the hoop-like breaker arrangement, the carcass serving only as a reinforcing connection between the hoop and bead portions. Accordingly, while the strength of the carcass may be safely reduced to a great extent, the breaker is required to have an extraordinarily high strength enough to sustain all the stresses possibly induced in the tire. This naturally results in an increased tire rigidity, making it practically impossible to travel with such tires over bad or irregular road surfaces. In addition, it has been necessary as a means of fitting the hoop over the carcass to first form the carcass alone and expand it before the hoop is fitted. This obviously makes the entire building process including the application of a tread over the hoop extremely difficult. On the other hand, the fact that any radially outward expansion of the radial tire is effectively restrained by the hoop arrangement results in a marked improvement of the high-speed characteristic of the tire and reduction in its rolling resistance.

The present invention proposes, as it were, a third cord arrangement which overcomes the deficiencies of the two previous cord arrangements while retaining their advantageous features.

As apparent from the foregoing description, in the inventive tire cord arrangement, the tire stresses are, in effect, shared by both breaker and carcass to give a maximixed tire efficiency and in this manner a tire structure is provided which is particularly suitable for use in countries including Japan where good and bad roads coexist in an intermingled state.

What is claimed is:

1. A method of producing a pneumatic tire comprising forming a carcass layer on a drum including cords which extend in their crown portion at an angle in the range of from 50–65° with respect to a circumferential line around the tire as measured after vulcanization thereof and applying to said crown portion an intermediate layer of a rubber material having a high fluidity relative to the other layer, applying a breaker layer on said carcass layer with the intermediate layer interposed therebetween, said breaker layer including cords which extend at an angle in the range of from 22–29° with respect to the circumferential line around the tire, and thereafter shaping and vulcanizing the layers on the drum to form the tire.

2. A pneumatic tire comprising a carcass layer including cords which extend in their crown portion at an angle in the range of from 50–65° to a circumferential line around the tire as measured after vulcanization thereof; a breaker layer including cords which extend at an angle in the range of from 22–29° to the circumferential line around the tire; and an intermediate layer of 1 to 3 mm. thickness provided between said carcass and breaker layers and constituted of a rubber material having higher fluidity than the rubber material of the carcass layer and the breaker layer when unvulcanized to enable the breaker layer and carcass layer to undergo relative angular change and the tire to be built in a single operation.

References Cited

UNITED STATES PATENTS

| | | | |
|---|---|---|---|
| 2,786,507 | 3/1957 | Howe | 152—361 |
| 3,081,811 | 3/1963 | Beckadolph | 152—361 |
| 3,205,931 | 9/1965 | Keefe | 152—361 |

FOREIGN PATENTS

| | | |
|---|---|---|
| 1,389,428 | 1/1965 | France. |
| 1,395,033 | 3/1965 | France. |
| 877,993 | 4/1953 | Germany. |

ARTHUR L. LA POINT, Primary Examiner

CHARLES B. LYON, Assistant Examiner

U.S. Cl. X.R.

152—361; 264—326

UNITED STATES PATENT OFFICE
CERTIFICATE OF CORRECTION

Patent No. 3,469,614                              September 30, 1969

Takashi Kobayashi

It is certified that error appears in the above identified patent and that said Letters Patent are hereby corrected as shown below:

In the heading to the printed specification, line 8, "40/66,098" should read -- 40/66,068 --.

Signed and sealed this 27th day of October 1970.

(SEAL)
Attest:

Edward M. Fletcher, Jr.                        WILLIAM E. SCHUYLER, JR.
Attesting Officer                                   Commissioner of Patents